(12) United States Patent
Masson et al.

(10) Patent No.: US 11,962,487 B2
(45) Date of Patent: Apr. 16, 2024

(54) METHOD FOR CONFIGURING A USER EQUIPMENT, USER EQUIPMENT, AND RULE MANAGEMENT ENTITY

(71) Applicant: Orange, Issy-les-Moulineaux (FR)

(72) Inventors: Pierre-Alexandre Masson, Chatillon (FR); Xiaobao Chen, Chatillon (FR); Antoine Mouquet, Chatillon (FR); Kevin Derval, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/787,725

(22) PCT Filed: Dec. 18, 2020

(86) PCT No.: PCT/FR2020/052525
§ 371 (c)(1),
(2) Date: Jun. 21, 2022

(87) PCT Pub. No.: WO2021/130440
PCT Pub. Date: Jul. 1, 2021

(65) Prior Publication Data
US 2023/0030528 A1 Feb. 2, 2023

(30) Foreign Application Priority Data

Dec. 23, 2019 (FR) ..................................... 1915479

(51) Int. Cl.
*G06F 15/173* (2006.01)
*H04L 45/00* (2022.01)
(52) U.S. Cl.
CPC .............. *H04L 45/14* (2013.01); *H04L 45/38* (2013.01)
(58) Field of Classification Search
CPC ..... H04L 45/38; H04L 45/14; H04L 41/0853; H04L 41/0894
(Continued)

(56) References Cited

U.S. PATENT DOCUMENTS 10,958,541 B2  3/2021  Chatras et al.
2020/0112492 A1  4/2020  Chatras et al.
(Continued)

FOREIGN PATENT DOCUMENTS

WO  2018141148 A1  8/2018
WO  2018220291 A1  12/2018

OTHER PUBLICATIONS

Mediatek Inc et al, "On the need for network-based coordination", vol. SA WG2, No. Reno, NV, US; Nov. 18, 2019-Nov. 22, 2019, 14 Nov. 2019 (Nov. 14, 2019), 3GPP Draft; S2-1911938, 3rd Generation Partnership Project (3GPP), Mobile Competence Centre ; 650, Route Des Lucioles ; F-06921 Sophia- Antipolis Cedex ; France, Retrieved from the Internet: URL:https://ftp.3gpp.org/tsg_sa/WG2_Arch/TSGS2_136_Reno/Docs/S2-1911938.zip S2-1911938 was S2-1911529.doc , XP051825337.
(Continued)

*Primary Examiner* — Lan Dai T Truong
(74) *Attorney, Agent, or Firm* — David D. Brush; Westman, Champlin & Koehler, P.A.

(57) ABSTRACT

A method for configuring a user device to which a plurality of identifiers, each uniquely identifying the user in at least one communications network, is allocated. The method includes, for at least one application: obtaining at least one rule associating, with at least one flow of the application, at least one slice of the at least one communications network for routing data relating to the at least one flow and an item of information connecting the slice to an identifier from among the plurality of identifiers of the user; and configuring the user device with the at least one rule such that it executes the at least one rule when accessing the application.

20 Claims, 3 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2021/0058297 A1* | 2/2021 | D'Acunto | H04W 24/02 |
| 2021/0083933 A1* | 3/2021 | Bull | H04L 47/22 |
| 2022/0272620 A1* | 8/2022 | Ninglekhu | H04W 88/02 |

OTHER PUBLICATIONS

"3rd Generation Partnership Project; Technical Specification Group Core Network and Terminals; User Equipment (UE) policies for 5G System (5GS); Stage 3 (Release 16)", Technical Specification, 3GPP TS 24.526 V16.1.0 (Sep. 2019).

"Introduction to Mobile Network Engineering GSM, 3G-WCDMA, LTE and the Road to 5G", Screenshot of p. 123, Third Generation Network (3G), UMTS, Jul. 3, 2018.

"3rd Generation Partnership Project; Technical Specification Group Services and System Aspects; Vocabulary for 3GPP Specifications (Release 15)", Technical Report, 3GPP TR 21.905 V15_1_0 (Dec. 2018).

"3rd Generation Partnership Project; Technical Specification Group Core Network and Terminals; Numbering, addressing and identification (Release 16)", Technical Specification, 3GPP TS 23.003 V16.0.0 (Sep. 2019).

"3rd Generation Partnership Project; Technical Specification Group Services and System Aspects; System Architecture for the 5G System (5GS); Stage 2 (Release 15)", Technical Specification, 3GPP TS 23.501 V15.7.0 (Sep. 2019).

English translation of the Written Opinion of the International Searching Authority dated Apr. 16, 2021 for corresponding International Application No. PCT/FR2020/052525, filed Dec. 18, 2020.

International Search Report dated Apr. 8, 2021 for corresponding International Application No. PCT/FR2020/052525, Dec. 18, 2020.

Written Opinion of the International Searching Authority dated Apr. 8, 2021 for corresponding International Application No. PCT/FR2020/052525, filed Dec. 18, 2020.

"3rd Generation Partnership Project; Technical Specification Group Services and System Aspects; Study on system enablers for devices having multiple Universal Subscriber Identity Modules (USIM) (Release 17)," Technical Report, 3GPP TR 23.761 V0.2.0 (Dec. 2019).

* cited by examiner

[Fig. 1]
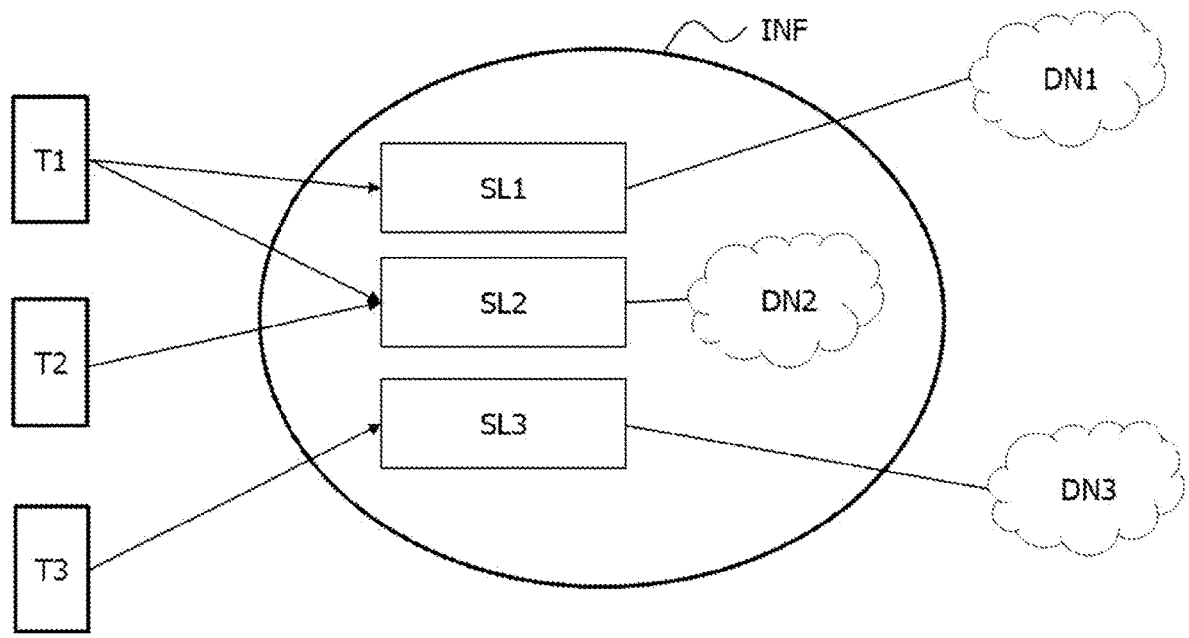
[Fig. 2]
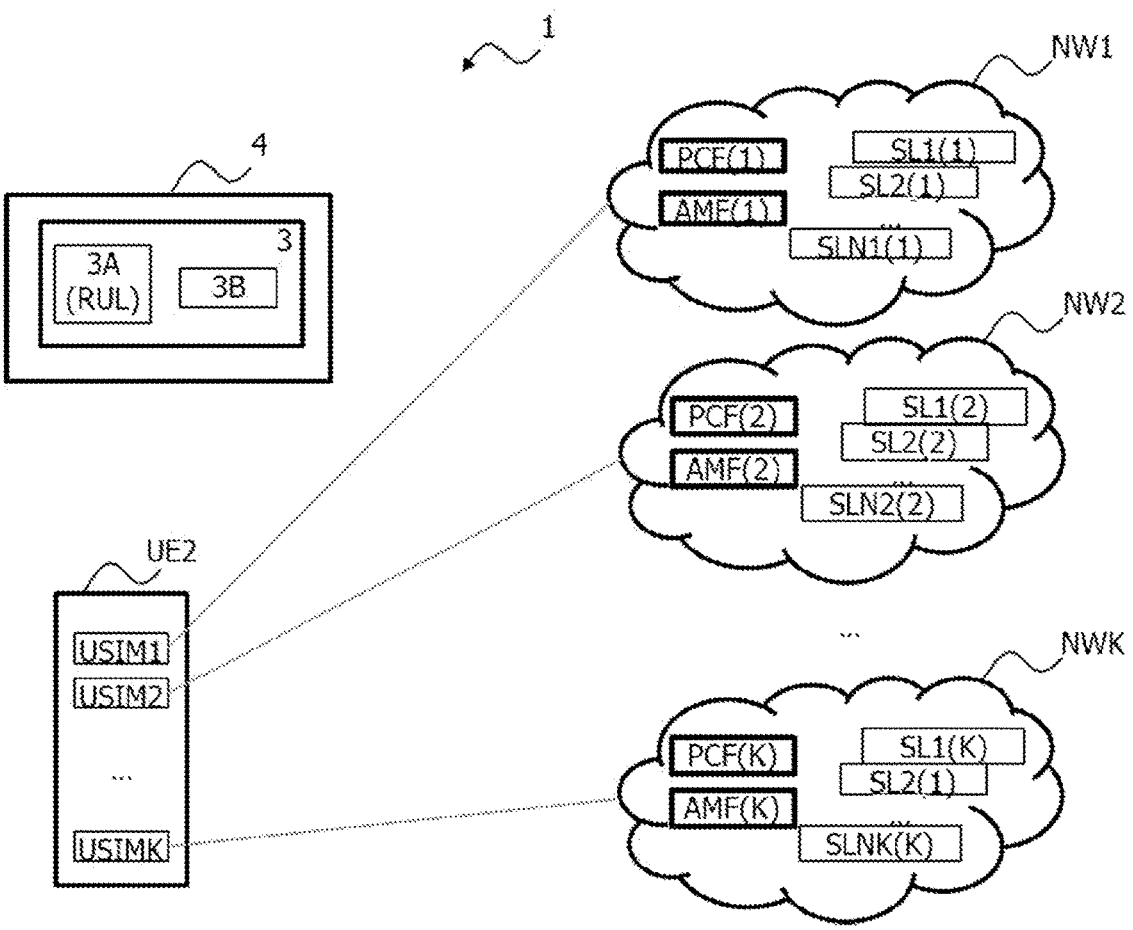

[Fig. 3]
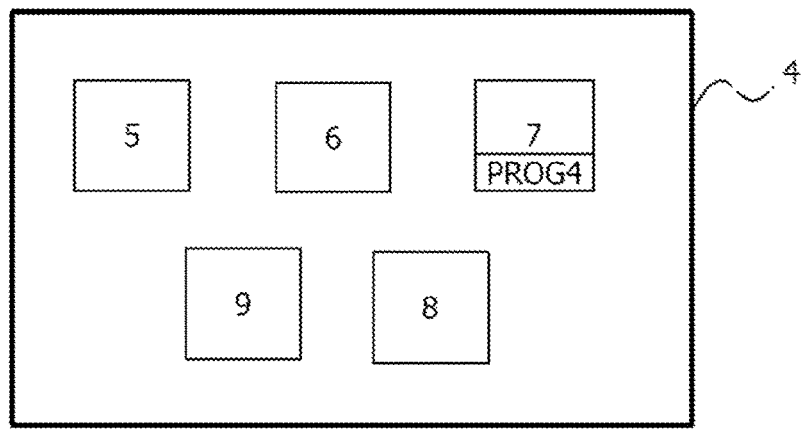
[Fig. 4]
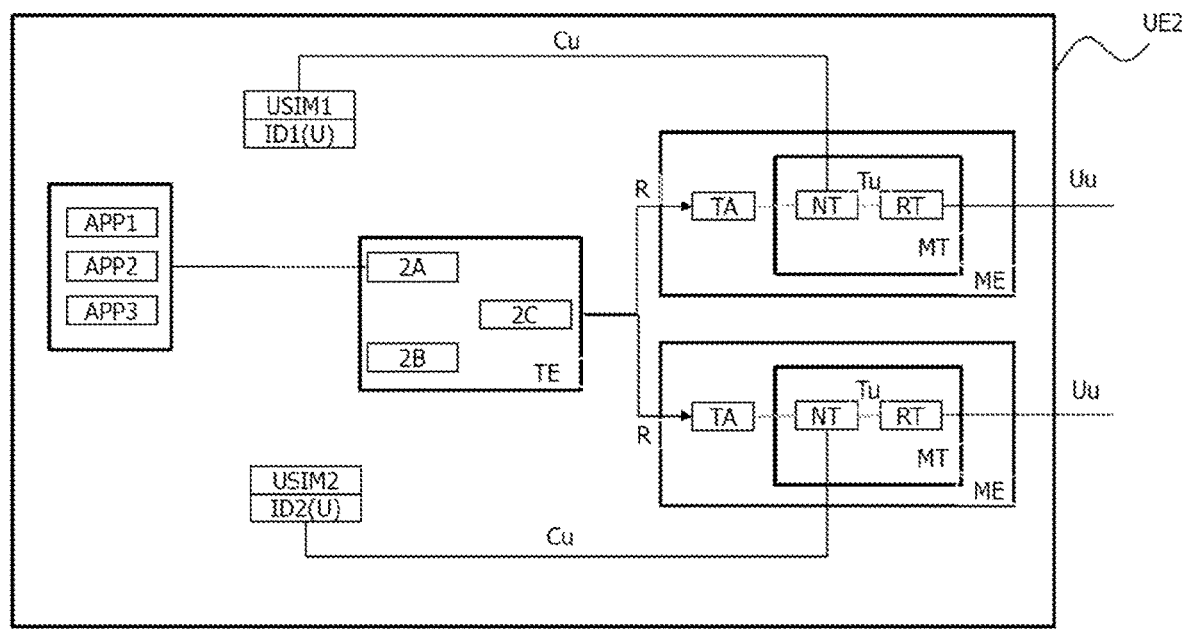
[Fig. 5]
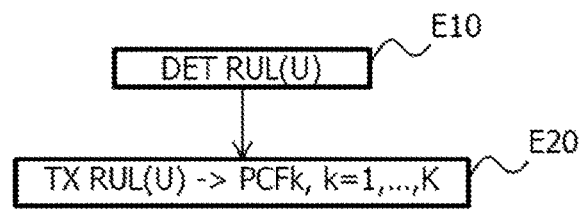

[Fig. 6]
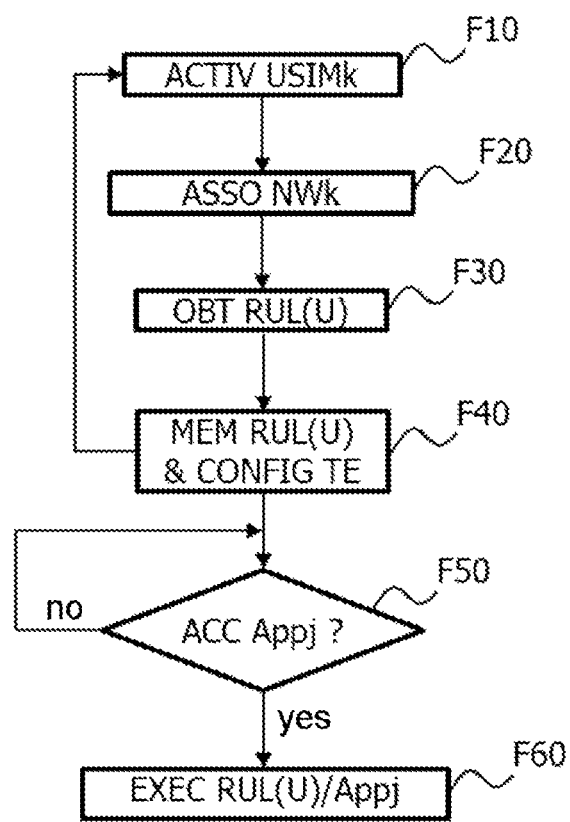

METHOD FOR CONFIGURING A USER EQUIPMENT, USER EQUIPMENT, AND RULE MANAGEMENT ENTITY

CROSS-REFERENCE TO RELATED APPLICATIONS

This Application is a Section 371 National Stage Application of International Application No. PCT/FR2020/052525, filed Dec. 18, 2020, the content of which is incorporated herein by reference in its entirety, and published as WO 2021/130440 on Jul. 1, 2021, not in English.

FIELD OF THE DISCLOSURE

The present invention is in the field of telecommunications.

More specifically, the invention relates to telecommunications network architectures implementing a technique for slicing networks, more commonly called "network slicing".

The invention specifically applies to mobile telecommunications networks.

BACKGROUND OF THE DISCLOSURE

The architecture of the mobile telecommunications networks that are currently deployed or are being deployed is defined by the standardization group known as 3GPP (Third Generation Partnership Project). This is particularly the case for mobile networks called second generation ("2G or GSM"), third generation ("3G"), and fourth generation ("4G") mobile networks.

Until the fourth generation, the network architectures defined by the 3GPP group are most often based on specific equipment, dedicated to precise functionalities, whether in terms of the access network or the network core, in particular with respect to the transmission of packets from or to a mobile terminal.

The lack of flexibility and upgradability inherent to this type of architecture has resulted in the 3GPP group contemplating adopting more flexible architectures for the next generation of mobile networks, namely "5G" networks, in order to be able to quickly respond to the extremely diverse demands in terms of traffic and/or quality of service contemplated by the 5G networks. It should be noted that the 5G networks are intended to equally relate to mobile networks and fixed networks.

Among the contemplated solutions, one of the most promising solutions is based on a network slicing technique. This technique is particularly described in technical specification 3GPP TS 23.501 v15.7.0, September 2019. It allows a network operator to create custom and independent end-to-end logical networks for its clients, from the same physical network infrastructure, capable of providing optimized solutions for various scenarios corresponding to various constraints in terms of functionalities, performance capabilities and qualities of service.

More specifically, the concept of network slices allows several network instances, also called "network slices", to be created. A network slice is made up of network functions, hardware resources (for example, storage and computation) and configurations for meeting the requirements of services, clients and/or terminals attached to this slice.

By way of an illustration, FIG. 1 shows a simplified view of a communications infrastructure INF comprising network slices SL1, SL2 and SL3 each representing a mobile network, the network slices SL1, SL2 and SL3 sharing functions implemented in data centers, such as, for example, routing, addressing, data flow control, naming functions, etc. In the example of FIG. 1, the network slices SL1, SL2 and SL3 grant access to three separate data networks DN1, DN2 and DN3. However, it should be noted that network slices can grant access to the same data network. Each network slice can be related to a separate mobile network, and is determined by the features of the data flows passing through this network slice, which have common points in terms of, for example, destination, routing, and security constraints, justifying common management within the same network slice. Each of the slices is thus optimized for the requirements of a type of service and/or of a type of client and/or of terminals. In the example illustrated in FIG. 1, terminal T1 is connected to network slices SL1 and SL2, terminal T2 is connected to slice SL2, and terminal T3 is connected to slice SL3.

The terminals of the users of the mobile networks also currently support an ever increasing number of applications offered by various stakeholders in the world of telecommunications (network operators, service providers, terminal manufacturers, etc.). Each of these applications can have specific requirements with respect to the routing of the data attached thereto (in other words, that it transmits or receives). These data are conveyed over slices of the network with which the terminal is registered or associated, via, for example, a USIM (Universal Subscriber Identity Module) embedded in the terminal. In a known manner, a USIM designates an application stored in a UICC (Universal Integrated Circuit Card), also commonly called SIM card, allowing a terminal to securely register on a network, and in particular on a cellular network.

It is therefore recommended that a slice of the network adapted to its requirements is selected in order to convey the data transmitted and received by each application. Technical specification 3GPP TS 23.501 v15.7.0, September 2019, indicates that the network can provide the terminal with rules allowing it to select a slice of a network as a function of the services that it wishes to use. However, this technical specification considers a terminal equipped with a single USIM card allowing it to register with a single network. Thus, the rules supplied to the terminal implicitly relate to the slices of a single network with which the terminal can register via its USIM card.

However, some terminals are configured to receive two USIM cards (this is referred to as a "dual SIM" terminal). These two USIM cards may or may not allow them to simultaneously benefit from the connectivity offered, for example, by two separate network infrastructures managed by different operators, or by the same network infrastructure, but in accordance with two different offers, for example, a "professional offer" and a "personal offer", with each offer being able to be associated with specific services offered by the operator of the network infrastructure. In the current state of the art, the user of a "dual SIM" terminal can, if allowed by his/her terminal, manually configure, in his/her terminal, which USIM card they wish to use as a function of the type of traffic transmitted and received by the terminal (voice, data or SMS (Short Message Service) messages). For this reason, all the voice type traffic transmitted or received by the terminal uses the USIM card manually configured by the user for voice type traffic, all the data type traffic transmitted or received by the terminal uses the USIM card manually configured by the user for the data type traffic, all the SMS type traffic transmitted or received by the terminal uses the USIM card manually configured by the user for the SMS type traffic, and this is the case for all the various applications installed on the terminal.

Technical specification 3GPP TS 23.501 does not mention how to manage the use of this type of "dual SIM" terminal, or, more generally, "multi-SIM" network in combination with a network slicing technique.

DISCLOSURE OF THE INVENTION

The invention particularly addresses this disadvantage by proposing a method for configuring a user equipment intended to be used by a user, to whom a plurality of identifiers is allocated, each uniquely identifying said user on at least one communications network, with this method being implemented by the user equipment and comprising, for at least one application:

a step of acquiring at least one rule associating, with at least one flow of said application, at least one slice of said at least one communications network for routing data relating to said at least one flow and information connecting said slice to an identifier from among said plurality of identifiers of the user; and a step of configuring the user equipment with said at least one rule so that it executes said at least one rule when accessing said application.

Correspondingly, a further aim of the invention is a user equipment intended to be used by a user, to whom a plurality of identifiers is allocated, each uniquely identifying the user on at least one communications network, this user equipment comprising:

an acquisition module, configured to acquire at least one rule associating, with at least one flow of an application, at least one slice of said at least one communications network for routing data relating to said at least one flow and information connecting said slice to an identifier from among said plurality of identifiers of the user; and an execution module, configured to execute said at least one rule when accessing the application.

An application is understood herein to mean any type of program or software intended to be installed on equipment for carrying out a task, or a set of elementary tasks that are executed using the operating system and the hardware resources of the equipment. This can be, for example, an electronic game, a web browser, a multimedia player, an online commerce application, a health data transmission, etc. It should be noted that the invention is equally applicable when the application is installed on the user equipment or on another equipment that can be accessed by the user equipment (for example, on a remote server, etc.).

There is no limitation to the nature of the User Equipment (or UE) to which the invention applies. It can be a terminal such as a smartphone, a laptop computer, a digital tablet, a connected object, but also a router, etc. Furthermore, the various modules of the user equipment can be hosted by different physical entities.

It should be noted that the invention is described, in view of the aforementioned technical problem, with reference to a "dual SIM" or "multi-SIM" user equipment; however, it is more generally applicable to any user equipment intended to be used by a user, to whom a plurality of separate identifiers is allocated, each uniquely identifying the user on at least one communications network. Such identifiers are, for example, IMSI (International Mobile Subscriber Identifier) type identifiers particularly used in 4G networks or SU-PI (SUbscription Permanent Identifier) type identifiers particularly used in 5G networks, or even of the MAC (Medium Access Control) address type for non-3GPP networks of the WLAN (Wireless Access Network) type. These are identifiers that are allocated to the user independently of one another and permanently: in other words, they are invariant as long as the user benefits from a subscription with a network. These identifiers can be respectively stored, in a particular embodiment, in a plurality of embedded USIM modules and/or network cards in the user equipment.

Thus, in a particular embodiment, the invention also relates to a user equipment configured to receive a plurality of USIM modules and/or network cards, with each card and/or each module being associated with a separate identifier from the plurality of identifiers allocated to the user.

This plurality of identifiers identifies the user and allows them to register, via his/her user equipment, with a plurality of separate networks (for example, with different Public Land Mobile Networks or PLMNs), or with the same network but benefiting from independent offers or subscriptions, each associated with a different identifier of the user (for example, a "professional subscription" and a "personal subscription" offered by the same network operator and based on the same network infrastructure). From the perspective of the networks, these identifiers are managed as if they were respectively allocated to as many different users.

The invention proposes configuring (for example, automatically) an equipment of a user having a plurality of identifiers allowing the user equipment to access one or more networks, with one or more rules allocating one or more slices of this or these networks to at least one flow of an application. Each rule preferably comprises an identifier of the application to which it refers. It should be noted that the rules can associate, with all the flows of the same application, the same slices of the one or more networks that the user equipment can access via the plurality of identifiers allocated to the user. However, the invention also offers, if necessary, an additional granularity allowing the network slices to be used to be distinguished as a function of the various types of flows that can be transmitted or received by the same application, or even individually as a function of each flow that can be transmitted or received by the same application. Various types of flow or various flows can correspond, for example, to flows conveying different types of data (audio, video, text, etc.), to flows with different destination addresses, a different remote IP address, a different remote port, etc. For example, the criteria for differentiating flows listed in table 5.2.1 of the 3GPP TS 24.526 specification entitled "User Equipment (UE) policies for 5G System (5GS); Stage 3", v16.1.0, September 2019, can be considered.

In other words, the rules transmitted to the user equipment for the configuration thereof take into account the fact that the user equipment benefits from multiple connectivity by virtue of the multiple identifiers that are allocated to the user. They are advantageously established by taking into account the features of the network slices associated with the various network(s), with which the user equipment can register, and the services associated with these network slices given the specific features of the considered applications. It should be noted that the rules supplied to the user equipment can relate to applications that are not installed thereon or that will not be executed thereby; in this case, they are not taken into account thereby, and can be removed from its configuration, if applicable.

In an alternative embodiment, the rules acquired by the user equipment relate to applications installed thereon.

For example, the user equipment can supply an entity responsible for establishing the rules with the identifiers of the applications that it hosts, when it registers with the one or more networks on which the user has identifiers, or at any other time (for example, when installing a new application).

The information explicitly associated in each rule with each network slice according to the invention advantageously allows unambiguous designation of the network to which the slice is attached if the identifiers allocated to the user correspond to various networks, or, if the slices are attached to the same network, the identifier that the user equipment must use in order to access this network slice.

In a particular embodiment, this information comprises, for a slice of a communications network:

said identifier from among said plurality of identifiers of the user;

an identifier of a module of said terminal containing said identifier; or an identifier of the communication network for which said identifier is allocated to said user.

In other words, the information associated with each network slice associated with an application flow contains either a direct reference to the identifier of the user to be used for communicating on this network slice, or an indirect reference to this identifier by means of, for example, the module that contains this identifier or even of the network to which it is attached (if the identifiers allocated to the user typically identify them on various networks). In the example of a multi-SIM user equipment, this information thus allows designation of the SIM to which the slice in question corresponds and which the user equipment must use for the flow of the application that is associated with this slice.

The result of the invention is that a multi-SIM user equipment can thus receive association rules between applications (or even application flows) and network slices for each of its embedded USIM modules and/or network cards. The invention thus allows, for an application of the user equipment, or even for various flows of the same application of the user equipment, a USIM module and a slice of the corresponding network to be associated. The flows of the same application therefore can be distributed over various slices of various networks as a function of the specific feature of each of these flows: this dispenses with being limited to a static distribution as a function of the type of traffic exchanged with the user equipment (voice, data, SMS). As a result of the granularity offered by the invention, there is better adaptation of the features of the network to the specific features of each application installed on the terminal, there is better availability of the applications and services offered to the user resulting therefrom, and therefore there is improved user experience over the prior art.

In a particular embodiment, the rules acquired by the user equipment are determined by a rule management entity. This rule management entity can be located in a mediation gateway between the various networks with which the user is subscribed or, if the user is subscribed to a single network via different subscriptions, can be located in this network. As an alternative embodiment, it is not necessarily associated with the networks and can be an entity independent thereof.

Thus, according to another aspect, a further aim of the invention is a method for managing rules, implemented by a rule management entity, with this method comprising, for at least one user to whom a plurality of identifiers is allocated, respectively uniquely identifying said user on at least one communications network:

a step of determining at least one rule associating, with at least one flow of an application, at least one slice of said at least one communications network for routing data relating to said at least one flow and information connecting said slice to an identifier from among said plurality of identifiers of said user; and a step of transmitting said at least one rule to a user equipment of the user.

Correspondingly, a further aim of the invention is a rule management entity comprising:

a determination module, configured to determine at least one rule associating, with at least one flow of an application, at least one slice of at least one communications network for routing data relating to said at least one flow and information connecting said slice to an identifier from among a plurality of identifiers allocated to said user and respectively uniquely identifying said user on said at least one communications network; and a transmission module configured to transmit said at least one rule to a user equipment of the user.

It should be noted that, depending on the considered context, the rule can be transmitted to the user equipment directly or indirectly via one or more entities of the networks with which the user equipment is subscribed.

For example, in a particular embodiment, said at least one rule is acquired when associating (or recording or attaching) the user equipment with said at least one communications network.

In this way, the user equipment automatically, and without any delay, has the rules to be applied in order to access the applications that it hosts or that it is likely to access. This occurs in a way that is imperceptible to the user of the user equipment.

As an alternative embodiment, the rules can be configured manually in the user equipment, for example, by the user of the user equipment, via a user interface provided to this end. Such an interface is, for example, a configuration menu available on the user equipment.

According to yet another alternative embodiment, the rules can be statically configured in the software of the user equipment.

As mentioned above, the rules are determined for each application by taking into account the various network slices and, if applicable, the various available networks. It should be noted that, preferably, they are determined by taking into account the features and subscriptions of each user; however, it is also possible to contemplate, in a particular embodiment, that the rules are defined only as a function of the specific features of the applications and that the same rules are sent to all the users, they are then responsible for not taking into account rules that are not applicable. They can also take into account other parameters, such as, for example, hardware and/or software features of the user equipment.

Various configurations can be contemplated for each rule.

Thus, for example, the same rule can associate, with one or more flows of an application, a plurality of separate network slices. This plurality of network slices can correspond to the same network or to separate communications networks.

In this embodiment, the application can simultaneously access the various network slices identified by the rule, for example, in order to distribute the load between the various network slices.

As an alternative embodiment, a usage priority can be assigned to each of said plurality of separate slices.

If these slices are attached to separate networks, this allows the user equipment to determine which network (for example, which USIM module or network card) it must use first, and, if this is not accessible (for example, because the USIM module or the corresponding network card is not activated within the user equipment), a fallback solution.

The usage priorities assigned to the various network slices contained in a rule can be assigned, in a particular embodiment, by the rule management entity, for example, so as to distribute a load over the various network slices. As an alternative embodiment, other criteria can be contemplated for establishing priorities between the network slices. These criteria can be linked to the user more specifically, for example, as a function of the user's subscription with the one or more relevant networks, or with the network coverage the user has, etc.

The rules can also contain instructions for using the network slices included in the rules, such as, for example, in a rule comprising a plurality of separate network slices, the instruction to distribute the load between these separate network slices, or to nominally use a particular slice and another particular slice as a backup, etc.

Furthermore, in a particular embodiment, the management entity can associate each rule with an execution priority for said rule.

Such a priority allows the user equipment, in the event of conflicts between two rules determined for two different applications to be executed simultaneously (for example, the user equipment can only convey traffic with a network at a given time, and two applications in progress are associated with network slices belonging to separate networks), to select the rule to be applied first. As an alternative embodiment, this priority can be provided by way of an indication and the user equipment can decide to act otherwise in the event of conflicts.

In a particular embodiment of the invention, the configuration method and/or the rule management method is implemented by a computer.

A further aim of the invention is a computer program on a recording medium, with this program being able to be implemented in a computer or, more generally, in a user equipment according to the invention and comprising instructions suitable for implementing a configuration method as described above.

A further aim of the invention is a computer program on a recording medium, with this program being able to be implemented in a computer or, more generally, in a rule management entity according to the invention and comprising instructions suitable for implementing a rule management method as described above.

Each program can use any programming language, and can be in the form of source code, object code, or intermediate code between source code and object code, such as in a partially compiled form, or in any other desirable form.

A further aim of the invention is an information medium or a computer-readable recording medium, and comprising instructions of the aforementioned computer program.

The information or recording medium can be any entity or device capable of storing the programs. For example, the medium can comprise a storage means, such as a ROM, for example, a CD ROM or a microelectronic circuit ROM, or even a magnetic recording means, for example, a hard disk, or a flash memory.

Furthermore, the information or recording medium can be a transmittable medium, such as an electrical or optical signal, which can be routed via an electrical or optical cable, by a radio link, by a wireless optical link or by other means.

The program according to the invention particularly can be downloaded over an Internet type network.

Alternatively, the information or recording medium can be an integrated circuit, in which a program is incorporated, the circuit being adapted to execute or to be used to execute the configuration method according to the invention or the rule management method according to the invention.

According to another aspect, the aim of the invention is a system comprising:

at least one user equipment according to the invention, intended to be used by a user, to whom a plurality of identifiers is allocated, uniquely identifying said user on at least one communications network;

a rule management entity according to the invention.

In a particular embodiment:

said at least one communications network comprises a plurality of communications networks;

the transmission module of said management entity is configured to transmit said at least one rule to an entity managing said user in each communications network; and each entity managing said user of each communications network is configured to transmit (directly or indirectly) said at least one rule to said user equipment when associating said user device with this communications network.

In another embodiment, said plurality of identifiers is allocated to the user by a single communications network and the rule management entity is an entity of this single communications network.

In yet another embodiment, the rule management entity is an entity independent of said at least one network.

The system benefits from the same advantages as the rule configuration and management methods (as well as the user equipment and the rule management entity) according to the invention, cited above.

It is also possible to contemplate, in other embodiments, that the configuration method, the rule management method, the user equipment, the rule management entity and the system according to the invention have all or some of the aforementioned features in combination.

BRIEF DESCRIPTION OF THE DRAWINGS

Further features and advantages of the present invention will become apparent from the following description, with reference to the accompanying drawings, which illustrate an embodiment lacking any limiting character. In the figures:

FIG. 1, already described, represents a network infrastructure of the prior art, in which a slicing technique is implemented;

FIG. 2 shows a first embodiment of a system according to the invention;

FIG. 3 shows an example of a hardware architecture of a rule management entity according to the invention, belonging to the system of FIG. 2, in a particular embodiment;

FIG. 4 shows an example of a hardware and functional architecture of a user equipment according to the invention, belonging to the system of FIG. 2, in a particular embodiment;

FIG. 5 illustrates the main steps of a rule management method as implemented by the rule management entity of the system of FIG. 2, in the first embodiment; and FIG. 6 illustrates the main steps of a configuration method as implemented by a user equipment of the system of FIG. 2, in the first embodiment.

DETAILED DESCRIPTION OF ILLUSTRATIVE EMBODIMENTS

As mentioned above, the invention falls within the context of communication networks using network slicing techniques.

In this context, it proposes a mechanism for configuring a user equipment with rules, with each rule associating one or more flows of a given application with one or more network slices, with these network slices optionally being attached to separate networks (for example, PLMNs). To this end, the user equipment is provided, for example, with a plurality of USIM modules and/or network cards allowing it to associate with these various networks, or with a single network but via various subscriptions.

It should be noted that the invention applies to any type of application (audio, video, for text transfer, multimedia player, etc.), real time or not real time, which can be natively installed on the user equipment, or downloaded from an application server, which is public or managed by a service provider, or even by the operator of one of the networks, etc.

FIG. 2 shows a first embodiment of a system 1 according to the invention configured for implementing such a mechanism.

In this first embodiment, it is assumed that a user U has a user equipment UE2, according to the invention, configured to receive a plurality of UICC cards (for example, K UICC cards, with K denoting an integer greater than or equal to 2), with each UICC card storing a USIM module. Each module USIMk, with k denoting an integer ranging between 1 and K, comprises an application allowing the user U to register and securely access a separate communications network NWk with which the user has taken out a subscription. To this end, each module USIMk stores an identifier IDk(U) allocated to the user U by the operator of the network NWk. This identifier uniquely and permanently and unchangeably identifies the user on the network NWk (i.e., throughout the duration of the user's subscription to the network). It should be noted that the user U can equally designate an individual user or a group of users, such as a community, for example.

In the example of FIG. 2, the communications networks NW1, ..., NWK are 3GPP 5GS (5G System) networks, and the identifiers IDk(U) are SUPI type identifiers. However, there is no limitation to the nature of the communications networks NW1, NW2, ..., NWK, nor to the nature of the access networks granting access thereto. It can particularly involve any cellular mobile networks as defined by the 3GPP standard (2G, 3G, 4G, 5G, etc.), or other types of networks, such as, for example, fixed networks, non-3GPP networks, such as WLAN (Wireless Local Area Network) networks (for example, Wi-Fi (Wireless Fidelity) networks), etc. The identifiers IDk(U) depend on the nature of the considered networks. Thus, it can involve, for example, as an alternative embodiment, IMSI type identifiers for 2G, 3G, 4G networks, a MAC address for a WLAN network, etc.

It is assumed that each network NWk implements a slicing technique for its subscribers, as mentioned in the aforementioned 3GPP TS 23.501 specification. SL1(k), ..., SLNk(k) denote the available slices of the network NWk, with Nk denoting an integer greater than or equal to 1 corresponding to the numbers of slices proposed by the network NWk, with Nk being able to vary from one network NWk to the next, and being able to evolve over time. Such a slicing technique is known per se and is not described in further detail herein. In a known manner, each network slice is uniquely identified on the network to which it belongs using an S-NSSAI (for "Single Network Slice Selection Assistance Information") identifier defined by the 3GPP standard in specifications TS 23.501 and TS 23.003 entitled "Technical Specification Group Core Network and Terminals; Number, Addressing and Identification", v16.0.0, September 2019.

In the first embodiment described herein, the rules, generally denoted RUL, used for configuring the user equipment UE2 are determined by a rule management entity 3, according to the invention, associated with the various networks NW1, ..., NWK, and hosted in a mediation gateway 4 interfacing with these various networks. More specifically in this case, in the case of 5G networks, the mediation gateway 4 interfaces with the PCF (Policy Control Function) management entities of the flow policy of each of the networks NW1, ..., NWK, referenced PCF1, ..., PCFK, respectively. In a manner known per se, the PCF entities allow the policies in the 5GS networks to be controlled, in particular on the AMF (Access and Mobility Management Function) entities of the networks NW1, ..., NWK (referenced AMF1, ..., AMFK, respectively), responsible for recording/attaching (or more generally associating) user equipment with the networks NW1, ..., NWK and locating them.

It should be noted that in the example contemplated in FIG. 2, for the sake of simplification, the rule management entity 3 is associated with the K networks NW1, ..., NWK corresponding to the K USIM modules of the user equipment UE2, i.e., it defines rules RUL for the users that have taken out subscriptions with these networks and, to this end, can see the features of the network slices corresponding to these various networks. However, this hypothesis is not limiting per se. The rule management entity 3 can be associated with other networks in addition to the networks NW1, ..., NWK. It also can be an entity independent of the networks NW1, ..., NWK (which can exploit, for example, the connectivity of one of the networks in order to communicate with the user equipment UE2 and discover, from information that it sends to the user equipment UE2, the slices it is offered by each of the networks).

In the embodiment described herein, the mediation gateway 4 has the hardware architecture of a computer, as schematically shown in FIG. 3, on which the rule management entity 3 is based. It particularly comprises a processor 5, a random-access memory 6, a read-only memory 7, a non-volatile flash memory 8, as well as communication means 9 comprising one or more communication interfaces allowing it to particularly communicate with the PCF entities of the networks NW1, ..., NWK.

In the embodiment described herein, the read-only memory 7 of the mediation gateway 4 is a recording medium according to the invention, readable by the processor 5 and on which a computer program PROG4 according to the invention is recorded, which program comprises instructions defining the main steps of a rule management method according to the invention. The program PROG4 equally defines functional modules of the rule management entity 3 (and correspondingly of the mediation gateway 4), which are based on or control the aforementioned hardware elements 5 to 9. These functional modules particularly comprise (see FIG. 2):

a determination module 3A, configured to determine, for at least one user equipment, at least one rule RUL as described in further detail hereafter, associating one or more slices of one or more networks with one or more flows of at least one application; and a transmission module 3B configured to transmit said at least one rule RUL to the relevant user equipment(s). It should be noted that this transmission can occur directly or indirectly, via one or more intermediate nodes. Thus, in the first embodiment described herein, the rules RUL are sent to the relevant user equipments by means of the PCF and AMF entities of the networks with which they are associated, as described in further detail hereafter.

In the example contemplated in FIG. 2, the user equipment UE2 is a terminal, such as a smartphone, a computer, or even a digital tablet, for example.

FIG. 4 schematically illustrates an example of a functional and hardware architecture of the user equipment UE2. In the example of FIG. 4, the user equipment UE2 is a dual-SIM device, i.e., it is configured to accommodate two separate USIM modules, namely a module USIM1 and a module USIM2, allowing it to respectively associate with the two networks NW1 and NW2.

Conventionally, the user equipment UE2 also comprises a TE (Terminal Equipment) module and two ME (Mobile Equipment) modules. Each ME module itself comprises a TA (Terminal Adaptor) module, an NT (Network Termination) module and an RT (Radio Termination) module. These various modules communicate together via various interfaces (Cu, R, Tu, Uu) as illustrated in the figure. Such modules and interfaces are known per se and are particularly described in specification document 3GPP TS 21.905 entitled "Technical Specification Group Services and System Aspects; Vocabulary for 3GPP Specifications", v15.1.0, December 2018, and chapter 9 of the book by A. Kukushkin entitled "Introduction to Mobile Network Engineering: GSM, 3G-WCDMA, LTE and the Road to 5G", John Wiley and Sons, 2018 (see FIG. 9.3 on page 123). The interface Tu connects the specific parts to the access network and to the network core in the user equipment; it is generally proprietary.

The TE module of the user equipment UE2 differs from a conventional TE module in that in this case it integrates various modules configured to implement a configuration method according to the invention, and, more specifically, in the first embodiment described herein:

an access module 2A, configured to access, via an application interface provided to this end, a plurality of applications Appj, j=1, . . . , J, with J denoting an integer greater than or equal to 1, installed on the user equipment UE2, for example (for example, in a non-volatile memory 10 of the user equipment UE2). In the example illustrated in FIG. 4, three applications App1, App2 and App3 are installed on the user equipment UE2;

an acquisition module 2B, configured to acquire at least one rule RUL as determined by the rule management entity 3 for the applications installed on the user equipment UE2; and an execution module 2C, configured to execute said at least one rule when accessing the applications installed on the user equipment UE2.

In the first embodiment described herein, the modules 2A, 2B and 2C are, for example, software modules defined by means of instructions of a computer program PROG2, comprising instructions corresponding to the main steps of a configuration method according to the invention.

It should be noted that the applications Appj, j=1, . . . , J are not necessarily applications natively present on the user equipment UE2; they may, or at least some of them may, have been subsequently downloaded onto the user equipment UE2 from a public or private application server. Furthermore, the applications and the number of applications present on the user equipment UE2 are likely to evolve over time (applications can be deleted, others added, so that the rules RUL configured on the user equipment UE2 are also likely to evolve over time). It is assumed herein that each application, whether or not it is installed on the user equipment UE2 and generally denoted App (for example, App=App1, App2 or App3 in the example contemplated in FIG. 4), is identified by an application identifier denoted IDApp. There is no limitation associated with the form of this identifier as long as it can be understood and known by the management entity 3 and the user equipment UE2.

As an alternative embodiment, all or some of the applications APPj, j=1, . . . , J can be installed on a physical entity separate from the user equipment UE2, for example, on a server accessible by that user equipment.

Furthermore, there is no limitation associated with the nature of the user equipment UE2. Indeed, the invention also applies to types of user equipment other than terminals, and in particular to routers, or to user equipment with TE and ME modules that can be distributed over several separate physical entities (for example, partly over a terminal and partly over an enterprise-grade router, etc.).

The various steps of the rule management method according to the invention will now be described, with reference to FIG. 5, as they are implemented by the rule management entity 3 in the first embodiment.

In this first embodiment, the rules RUL are determined by the rule management entity 3 associated with the networks NW1, . . . , NWK, via its determination module 3A, during a phase, called supply phase, for a plurality of applications App (step E10). This plurality of applications particularly includes, in this case, all or some of the applications Appj, j=1, . . . , 3 installed on the user equipment UE2 of the user U.

Furthermore, in the first embodiment described herein, the rule management entity 3 determines rules RUL individually for each user for which it is responsible for defining rules (in other words, in this case, for each user having subscribed to the networks NW1, . . . , NWK with which the rule management entity 3 is associated). To this end, the rule management entity 3 takes into account the features of the subscriptions of the user with the operators of the networks NW1, . . . , NWK. To this end, it is assumed that the rule management entity 3 is, for example, configured with information relating to the subscriptions available to each of the users for which it has to define rules. In particular, the rule management entity 3 is configured in this case with the list of networks (for example, PLMN) to which these users have access via their respective user equipment, the rights granted by their subscriptions, the associated quality of service attributes, the hardware and software features of the user equipment of the users, etc. Of course, this list is neither exhaustive nor limits the invention. These are merely illustrative examples of information with which the rule management entity 3 can be configured and that it can use to define the rules RUL. Furthermore, it should be noted that this information is likely to evolve over time and thus is dynamically updated on the rule management entity 3 (for example, continuously, or at (pre-)determined time intervals, or even upon detection of a change, etc.).

As an alternative embodiment, the rule management entity 3 can access this information by directly consulting the operators of the networks with which the users have subscribed or by accessing a database filled and updated by these operators so that it reflects a current state of the subscriptions taken out by the users with these operators.

According to yet another alternative embodiment, an application installed in the user equipment of the users managed by the rule management entity 3 can be configured to register with the rule management entity 3 and to provide it with this information.

It should be noted that, in another embodiment, the rule management entity 3 can determine rules RUL no longer individually for each user, but per application, all users combined.

In the first embodiment described herein, the plurality of applications for which the rule management entity 3 determines a set of rules RUL for each user is predefined. Throughout the remainder of the description, for ease of understanding, reference is made to the rules established for the user U, yet the presented considerations nevertheless equally apply to all users managed by the rule management entity 3.

It can particularly involve applications for which agreements have been established between the suppliers of the applications and the operators of the networks NW1, . . . , NWK associated with the rule management entity 3, or those with which the considered user U has taken out a subscription.

As an alternative embodiment, the plurality of applications can be established as a function of the services the user U has subscribed to on the networks NW1, . . . , NWK associated with the rule management entity 3. It can also take into account applications installed on the user equipment UE2 of the user U. Thus, in the example contemplated in FIG. 3, the rule management entity 3 can determine rules for the three applications App1, App2 and App3 installed on the user equipment UE2. To this end, it is possible to contemplate that the user equipment UE2 notifies the rule management entity 3 of the applications that it hosts via a network with which it is associated by means of one of its USIM modules. Alternatively, such a network can detect that an application is installed on the user equipment UE2 (by analyzing the traffic relating to the user equipment UE2) and notify the rule management entity 3.

As mentioned above, each rule determined by the rule management entity 3 via its determination module 3A associates with at least one flow of a given application App, for routing data relating to this flow, at least one slice of a communication network from among the networks NW1, . . . , NWK with which the user U has taken out a subscription. A different rule can be determined for each separate flow of the application, for part of the flows (for example, per flow type), or for all the flows of the application, according to the desired granularity. Distributing flows from the same application over separate network slices, for example, as a function of the nature (i.e., of the type) of these flows (for example, audio, video, text), can allow better adaptation of the transmission conditions of these flows. This can also allow the load to be distributed over the various available network slices.

There is no limitation to the criteria used for associating the network slices with the flows of each application considered by the rule management entity 3. The rule management entity 3 advantageously is able to see all the network slices proposed by the set of networks NW1, . . . , NWK, so that it can associate a flow of an application of the network slices belonging to various networks.

This association can be carried out dynamically, as a function of knowledge concerning the state of the available network slices corresponding to the various networks NW1, . . . , NWK. It also can be based on consulting a database within the rule management entity 3 or that can be accessed thereby on an external server associating, with an application identifier and/or one or more flow identifiers of said application, network slices suitable for routing data relating to these flows. Such a database can be established in conjunction with the operators of the networks NW1, . . . , NWK corresponding to the available network slices.

More specifically, according to the invention, each rule determined for one or more flows of an application for the user U associates, with this or these flow(s), at least one network slice SLi(k) (i can be equal to 1, . . . , Nk) and information (explicit) linking this network slice to the identifier IDk(U) uniquely identifying the user U on the network NWk (k can be equal to 1, . . . , K) to which this network slice belongs.

In the first embodiment, each identifier IDk(U) identifies the user U on a different network NWk, this information can be made up of an identifier of the network NWk, also commonly denoted PLMNId and corresponding to the MCC (Mobile Country Code) and MNC (Mobile Network Code) codes of the network NWk. Indeed, this network identifier, in the first embodiment, unambiguously designates the identifier IDk(U) and therefore the module USIM that the user U must use in order to access this network slice.

As an alternative embodiment, this information can be the identifier IDk(U) itself, or an identifier of a module of the user equipment UE2 of the user U containing said identifier IDk(U) (for example, USIM module or network card), such as an ICCid (serial number of a UICC card) or eID identifier.

As mentioned above, the rule management entity 3 can associate, with each flow or a set of flows of an application, one or more separate network slices, selected by the rule management entity 3 from among the network slices offered by the networks NW1, . . . , NWK. Each flow and each application affected by a rule are identified in the rule by an identifier allowing them to be unambiguously identified from the networks and from the user equipment UE2. When several network slices are associated with the same flow or with the same set of flows, these network slices can belong to the same network or to various networks. Furthermore, they can be associated with a usage priority assigned by the rule management entity 3 or the rule can comprise one or more instructions for using these multiple network slices, such as, for example, an instruction to distribute the load over the various network slices.

Different criteria can be considered by the rule management entity 3 in order to assign a usage priority to each network slice. The priorities set by the rule management entity 3 can take into account, for example, features of the subscription of the user U, and/or specific hardware and/or software features of the user equipment UE2 of the user U, or can aim to distribute a load over the various network slices, etc.

By way of an illustration, examples of rules are provided in table 1 below.

TABLE 1

| RUL | IDApp | IDFlow | Context | S-NSSAI/PLMNId |
|---|---|---|---|---|
| RUL1 | App1 | Flow1 | Unique connectivity | PRIO1: S-NSSAI1/PLMN1 PRIO2: S-NSSAI1/PLMN2 |
| RUL2 | App1 | Flow1 | Multiple connectivity | S-NSSAI1/PLMN1 S-NSSAI1/PLMN2 |
| RUL3 | App1 | Flow1 | Multiple connectivity | S-NSSAI1/PLMN1 S-NSSAI1/PLMN2 instruction: distribute a load between the slices |

In this table:

the "IDFlow" field denotes the identifiers of the one or more flows affected by the rule; it should be noted that the flows affected by the rules can be designated by their features (for example, a flow can be designated by its destination address, the port it uses, etc.), without necessarily having to use an identifier;

the "Context" field indicates the connectivity context of the user equipment in which the rule is applied (depending on whether it is in a configuration where it benefits from unique connectivity, i.e., via a single USIM module, or a simultaneous multiple connectivity); it should be noted that this context can be transmitted in the rule or can be a pre-requisite of the user equipment; and the "S-NSSAI/PLMNId" field denotes the slices associated with the flow, with each slice being identified by an S-NSSAI identifier and associated with information allowing this slice to be connected to an identifier of the user U uniquely identifying it on the network to which the slice belongs. In table 1, this information is the identifier of the relevant network NWk (PLMNId). Each slice also can be associated with a usage priority and/or, when several slices are designated, a rule for using these slices can be added to the rule.

Furthermore, when rules are determined for a plurality of applications, the management entity 3 can include a usage priority for the rule in each rule in order to prioritize, to a certain extent, the access to the slices of the networks NW1, ..., NWK by the applications. These usage priorities aim to allow any conflicts to be managed between rules that can be present on the user equipment UE2 during concurrent access to several applications simultaneously. For example, such a conflict occurs when several applications are executed simultaneously and each rule associated with each application returns to the use of a separate network while the user equipment UE2 can only access a single network at a given instant (the user equipment UE2 is then called "single active" user equipment). It should be noted that these usage priorities can have a restrictive value for the user equipment UE2 (which then has to apply them in order to manage conflicts between applications), or, on the contrary, can have an indicative value that the user equipment UE2 is free not to take into account.

Thus, according to rule RUL1, when the user equipment UE2 benefits from simple connectivity via one of its USIM modules (i.e., it can use only one of these modules at a given time, for example, because it is configured in "single active" mode), the flows with identifier Flow1 of the application App1 are associated as a priority (corresponding to "PRIO1") with the slice of the network NW1 (PLMNId=PLMN1) with the identifier S-NSSAI1, and then according to a lower priority (corresponding to "PRIO2") with the slice of the network PLMN2 with the identifier S-NSSAI1. In other words, in accordance with this rule RUL1, the user equipment UE2 has to use as a priority, for the flows corresponding to the identifier Flow1 of the application App1, the network slice S-NSSAI1 of the network NW1 (corresponding to the identifier PLMN1). If it does not have connectivity over the network NW1 (for example, because its module USIM1 is deactivated), then it can use the network slice S-NSSAI1 of the network NW2 for these flows.

According to rule RUL2, when the user equipment UE2 benefits from multiple connectivity via its two USIM modules (i.e., it can use its modules USIM1 and USIM2 simultaneously), the flows with identifier Flow1 of the application App1 can be equally sent over the slice of the network NW1 (PLMNId=PLMN1) with the identifier S-NSSAI1, or over the slice of the network PLMN2 with the identifier S-NSSAI1.

According to rule RUL3, when the user equipment UE2 benefits from multiple connectivity via its two USIM modules (i.e., it can use its modules USIM1 and USIM2 simultaneously), the flows with identifier Flow1 of the application App1 are distributed over the slice of the network NW1 (PLM-NId=PLMN1) with the identifier S-NSSAI1 and over the slice of the network PLMN2 with the identifier S-NSSAI1 so as to balance the load between the two network slices. To this end, the user equipment UE2 may have been pre-configured to manage load distribution for one or more data applications.

It should be noted that, as an alternative embodiment, upon receiving a rule associating, with one or more flows of one application, several separate network slices, in the absence of an additional instruction provided by the rule management entity 3 for the use of these multiple network slices, the user equipment UE2 can poll the rule management entity 3 with respect to the possibility of distributing the load between these multiple network slices, and can implement such load distribution upon receipt of a positive response from the rule management entity 3.

Of course, these examples are only provided by way of an illustration and other examples of rules can be contemplated.

Once the rules RUL are determined by the rule management entity 3 for each user and for each application, they are transmitted by said application, via its transmission module 3B, to the relevant users (step E20). In the first embodiment described herein, this transmission is carried out indirectly via the networks NW1, NWK to which the users have subscribed, and, more specifically, via the PCF and AMF entities of these networks.

More specifically, in the first embodiment described herein, during the supply phase, the rule management entity 3 sends, to each entity PCFk, k=1, ..., K of each network NWk, k=1, ..., K, the rules RUL of the users that have subscribed to this network. In the example of the user U who has taken out a subscription to the networks NW1, ..., NWK, the rule management entity 3 thus sends the rules RUL(U) determined for the user U to the entities PCF1, PCF2, ..., PCFK of the networks NW1, NW2, ..., NWK. This transmission closes the supply phase.

It should be noted that the rule management entity 3 can, in order to guarantee the integrity and the up-to-dateness of the rules RUL(U) reaching the user equipment U via the networks NW1, ..., NWK, sign these rules (in a manner known per se and not described herein) and/or associate them with a timestamp.

The various steps of the configuration method according to the invention will now be described with reference to FIG. 6, as they are implemented by the user equipment UE2 of the user U (and more specifically by its TE module) in the first embodiment.

In this first embodiment, the rules RUL(U) determined by the rule management entity 3 for the user U are transmitted to the user equipment UE2 when they are associated with the various networks NW1, ..., NWK.

More specifically, when a module USIMk (with k selected from 1, ..., K) is activated on the user equipment UE2 in order to access the network NWk (manually by the user U or automatically, for example, when powering up the user equipment UE2) (step F10), the user equipment UE2 is associated, by means of its module USIMk, with the corresponding network NWk by means of the identifier IDk(U) uniquely identifying the user U on the network NWk (step F20). This association can involve, depending on the relevant network, registering (or attaching) the user equipment UE2 to the network NWk and, more specifically, to the entity AMFk of the network NWk in this case, and particularly includes authentication of the user equipment by means of the identifier IDk(U). Such a procedure is known per se and is not described further herein.

This association triggers the user equipment UE2 acquiring rules RUL(U) determined by the rule management entity 3 for the user U for a plurality of applications App (step F30). More specifically, the entity AMFk with which the user equipment UE2 is associated asks the PCFk entity to acquire the rules RUL(U) determined by the rule management entity 3. Upon receipt of these rules RUL(U), the entity AMFk transmits them to the user equipment UE2, and, more specifically, to the module 2B of the TE module of the user equipment UE2, for example, in the URSP (UE Route Selection Policy) rules defined by the 3GPP standard and particularly described in the aforementioned 3GPP TS 24.526 document.

The rules RUL(U) thus acquired are transmitted to the execution module 2C of the user equipment UE2 for interpretation and application. They are stored by that user equipment, for example, in the non-volatile memory of the user equipment UE2 (step F40). For this reason, the TE module is configured to execute the rules RUL(U) via its execution module 2C when the user equipment UE2 accesses, via its access module 2A, one of the applications that it hosts (in the example of FIG. 3, to any one of the applications App1, App2 and App3) (or as an alternative embodiment, which is on a remote server).

This operation is repeated for each network NWk with which the user equipment UE2 is associated using the unique identifier IDk(U) allocated thereto by the network NWk. It should be noted that the user equipment UE2 for this reason can receive the rules RUL(U) several times. In an alternative embodiment, the rule management entity 3 can send priority rules to the user equipment UE2 to be applied, if applicable, between the rules received from the various networks NWk, in particular if these differ from one another.

Upon detection, by the TE module of the user equipment UE2, of access to an application Appj (yes response in test step F50), the execution module 2C identifies whether at least one rule from among the rules RUL(U) relates to the application Appj and, if applicable, executes, when accessing the application Appj, the one or more identified rules, denoted RUL(U)/Appj, for routing flows relating to this application (step F60). In other words, it transmits and receives, over the one or more network slices associated with the flows indicated in the rules RUL(U)/Appj, the flows of the application in accordance with the instructions indicated in the rules and, if applicable, the priorities assigned to the various network slices.

It should be noted that in the case of simultaneous execution of several applications and conflicting rules, as previously described, the user equipment UE2 can select the rule to be executed as a function of a usage priority provided by the rule management entity 3 in each rule.

Furthermore, it should be noted that if a new application is installed on the user equipment UE2 and that the user equipment does not have rules for this application, it can ask the rule management entity 3 to provide such a rule while indicating, for example, the identifier of the newly installed application.

Thus, by virtue of the invention, the user equipment UE2 can benefit from the combined advantages of "network slicing", of multiple connectivity, and of differentiated processing of the applications up to and including differentiation of the flows relating to each application. This results in significantly improved user experience over the prior art, and in a way that is imperceptible to the user, with the configuration of his/her user equipment UE2 being able to be carried out automatically without requiring the user's intervention. However, in a particular embodiment, it should be noted that a manual configuration of the user equipment UE2 by the user U can be contemplated in order to use the rules RUL(U). The user can, for example, make a selection from among the rules that are proposed, or delete those that do not relate to applications installed on his/her user equipment UE2, etc.

In the first embodiment that has just been described with reference to FIGS. 2 to 6, the identifiers IDk(U) stored in the modules USIMk, k=1, . . . , K embedded in the user equipment UE2 identify the user U on separate networks NW1, . . . , NWK (for example, managed by different operators). However, the invention is not limited to this context. It can also be applied, in a second embodiment, when the identifiers IDk(U) stored in the modules USIMk, k=1, . . . , K embedded in the user equipment UE2 identify the user U on the same network (for example, NW1= NW2= . . . =NWK correspond to the same network infrastructure managed by the same operator and associated with the same operator code MCC-MNC), but correspond to different subscriptions (or subscription offers). In the example illustrated in FIG. 4, the module USIM1 corresponds, for example, to a personal subscription taken out by the user U with the operator of a network NW1 (and corresponding to an identifier ID1(U)) and the module USIM2 corresponds to a professional subscription taken out by the user U with the operator of the same network NW1 (and corresponding to an identifier ID2(U)). The identifiers ID1(U) and ID2(U) are, for example, IMSI or SUPI identifiers uniquely and separately identifying the user U on the network NW1 within the context of his/her two subscriptions. Thus, when the user equipment UE2 accesses the network NW1 via the personal subscription of the user U, it uses the module USIM1 to associate with the network NW1 and the corresponding identifier ID1(U) stored in the module USIM1. When the user equipment UE2 accesses the network NW1 via the professional subscription of the user U, it uses the module USIM2 to associate with the network NW1 and the corresponding identifier ID2(U) stored in the module USIM2.

In this second embodiment, the network slices considered by the rule management entity 3 during step E10 of determining the rules therefore belong to the same network NW1. However, they can correspond to different subscriptions of the user U and therefore to different qualities of service, access to different services, etc. In other words, a user can access various network slices according to the subscription and, more specifically, the USIM module the user uses to access the network NW1. The information connecting each slice identified in a rule with an identifier IDk(U) of the user U cannot then be limited to an identifier of the network NW1, since this is the same for each identifier IDk(U) of the user U. In the second embodiment, this information therefore is preferably made up of the identifier IDk(U) itself corresponding to the considered network, or an identifier of the USIM module containing the identifier IDk(U) and therefore used to access the considered network.

Furthermore, it should be noted that, in the second embodiment, the rule management entity 3 can be integrated into an entity of the network NW1. In this case, the rules RUL(U) can be transmitted directly by the rule management entity 3 to the user equipment UE2 when it is associated with the network NW1 (irrespective of the USIM module that is used) or by means of, as in the previously described first embodiment, one or more of the PCF and AMF modules of the network NW1 (it is possible, depending on the contemplated architecture, to consider the same PCF and the same AMF for the two subscriptions, or a dedicated PCF and AMF for each subscription).

The other steps and operating modes described with reference to the first embodiment are applicable to the second embodiment.

A third embodiment also can be contemplated, in which the user equipment UE2 is configured to receive USIM modules allowing it to associate with separate networks and USIM modules allowing it to associate with the same network, corresponding to a combination of the two first embodiments that have been described. Preferably, in this third embodiment, the rule management entity 3 is an entity outside the considered networks, and the information connecting each network slice to an identifier IDk(U) of the user U is, as in the second embodiment, either the identifier IDk(U) itself or an identifier of the module containing the identifier IDk(U).

In the three embodiments described above, the rules RUL(U) are supplied to the user equipment UE2 when it is associated with the one or more networks with which it has taken out a subscription. As an alternative embodiment, it is possible to contemplate that these rules RUL(U) are supplied at other times, for example, upon request from the user equipment UE2 (following the installation of a new application, for example, for which it does not have rules), etc.

Furthermore, in these three embodiments, an automatic configuration of the user equipment UE2 with the rules supplied by the rule management entity 3 has been contemplated, in a imperceptible way for the user U. In a fourth embodiment, it is possible to contemplate that this configuration is implemented by the user U via a user interface of the user equipment UE2, such as, for example, a configuration menu available on the multi-SIM user equipment UE2. To this end, the user equipment UE2 has identifiers for the network slices it has access to for each network NWk for which it has a unique identifier IDk(U). The user U, via the aforementioned user interface, can then define the rules RUL(U) for using these different slices for all or some of the flows of each application installed on their user equipment and in this way can configure the user equipment so that it uses these rules when it accesses an application.

As an alternative embodiment, the user equipment can be configured in a "hard" manner in the user equipment software as a function of the rules RUL(U) supplied, for example, by an outside entity such as the rule management entity 3 or by the user U.

Although the present disclosure has been described with reference to one or more examples, workers skilled in the art will recognize that changes may be made in form and detail without departing from the scope of the disclosure and/or the appended claims.

The invention claimed is:

1. A configuration method for configuring a user equipment intended to be used by a user, to whom a plurality of identifiers is allocated, each uniquely identifying said user on at least one communications network, said method being implemented by said user equipment and comprising, for at least one application:
   acquiring at least one rule associating, with at least one flow of said application, at least one slice of said at least one communications network for routing data relating to said at least one flow and information connecting said slice to an identifier from among said plurality of identifiers of the user; and
   configuring the user equipment with said at least one rule so that the user equipment executes said at least one rule when accessing said application.

2. The configuration method as claimed in claim 1, wherein said at least one rule is acquired when associating the user equipment with said at least one communications network.

3. The configuration method as claimed in claim 1, wherein said at least one rule comprises a plurality of separate slices.

4. The configuration method as claimed in claim 3, wherein, in said at least one rule, a usage priority is assigned to each of said plurality of separate slices.

5. The configuration method as claimed in claim 1, wherein the acquiring and configuring the user equipment are carried out by using a user interface available on the user equipment.

6. The configuration method as claimed in claim 1, wherein said information comprises, for a slice of a communications network:
   said identifier from among said plurality of identifiers of the user;
   an identifier of a module of said user equipment containing said identifier; or
   an identifier of said communication network, for which said identifier is allocated to said user.

7. The configuration method as claimed in claim 1, wherein said at least one rule comprises an identifier of said application.

8. The configuration method as claimed in claim 1, wherein said application is an application installed on said user equipment.

9. The configuration method as claimed in claim 1, wherein at least two of said identifiers allocated to the user identify said user on two different communication networks.

10. The configuration method as claimed in claim 1, wherein at least two of said identifiers allocated to the user identify said user on the same communication network.

11. The configuration method as claimed in claim 1, wherein at least one of the at least one rule associates a plurality of slices corresponding to separate communications networks with at least one flow of an application.

12. A rule management method for managing rules, implemented by a rule management entity, said method comprising, for at least one user, to whom a plurality of identifiers is allocated, respectively uniquely identifying said user on at least one communications network:
   determining at least one rule associating, with at least one flow of an application, at least one slice of said at least one communications network for routing data relating to said at least one flow and information connecting said slice to an identifier from among said plurality of identifiers of said user; and
   transmitting said at least one rule to a user equipment of said user.

13. The rule management method as claimed in claim 12, further comprising assigning, in at least one determined rule comprising a plurality of slices of said at least one communications network, a usage priority to each slice.

14. The rule management method as claimed in claim 12, wherein at least one determined rule comprising a plurality of slices of said at least one communications network comprises an instruction for distributing a load over said plurality of slices.

15. The rule management method as claimed in claim 12, wherein rules associated with flows of various applications comprise usage priorities for said rules.

16. The rule management method as claimed in claim 12, wherein said information comprises, for a slice of a communications network:
- said identifier from among said plurality of identifiers of the user;
- an identifier of a module of said user equipment containing said identifier; or
- an identifier of said communication network, for which said identifier is allocated to said user.

17. A user equipment intended to be used by a user, to whom a plurality of identifiers is allocated, each uniquely identifying said user on at least one communications network, said user equipment comprising:
- a processor; and
- a non-transitory computer-readable medium comprising instructions stored thereon which when executed by the processor configure the user equipment to:
- acquire at least one rule associating, with at least one flow of an application, at least one slice of said at least one communications network for routing data relating to said at least one flow and information connecting said slice to an identifier from among said plurality of identifiers of the user; and
- execute said at least one rule when accessing said application.

18. The user equipment as claimed in claim 17, further comprising a plurality of USIMs (Universal Subscriber Identity Modules) and/or network cards, each card and/or each USIM module being associated with a separate identifier from among said plurality of identifiers.

19. A rule management entity comprising:
- a processor; and
- a non-transitory computer-readable medium comprising instructions stored thereon which when executed by the processor configure the rule management entity to, for at least one user:
- determine at least one rule associating, with at least one flow of an application, at least one slice of at least one communications network for routing data relating to said at least one flow and information connecting said slice to an identifier from among a plurality of identifiers allocated to said user and respectively uniquely identifying said user on said at least one communications network; and
- transmit said at least one rule to a user equipment of said user.

20. A system comprising:
- at least one user equipment intended to be used by a user, to whom a plurality of identifiers is allocated, each uniquely identifying said user on at least one communications network, said user equipment comprising:
  - a first processor; and
  - a first non-transitory computer-readable medium comprising instructions stored thereon which when executed by the first processor configure the user equipment to:
  - acquire at least one rule associating, with at least one flow of an application, at least one slice of said at least one communications network for routing data relating to said at least one flow and information connecting said slice to an identifier from among said plurality of identifiers of the user; and
  - execute said at least one rule when accessing said application; and
- a rule management entity comprising:
  - a second processor; and
  - a second non-transitory computer-readable medium comprising instructions stored thereon which when executed by the second processor configure the rule management entity to:
  - determine the at least one rule; and
  - transmit said at least one rule to the user equipment.

* * * * *